United States Patent [19]

Huang et al.

[11] Patent Number: 5,294,503
[45] Date of Patent: Mar. 15, 1994

[54] ANODE FOR RECHARGEABLE AMBIENT TEMPERATURE LITHIUM CELLS

[75] Inventors: Chen-Kuo Huang, South Pasadena; Subbarao Surampudi, Glendora, both of Calif.; Alan I. Attia, Needham, Mass.; Gerald Halpert, Pasadena, Calif.

[73] Assignee: The United States of America as represented by the National Aeronautics and Space Administration, Washington, D.C.

[21] Appl. No.: 959,858

[22] Filed: Oct. 13, 1992

[51] Int. Cl.$^5$ .............................. H01M 4/58
[52] U.S. Cl. ......................... 429/194; 424/218; 252/182.1; 423/324
[58] Field of Search ............... 429/194, 218; 252/182.1; 423/324

[56] References Cited

U.S. PATENT DOCUMENTS

| | | | |
|---|---|---|---|
| 4,024,322 | 5/1977 | McKaveney | 429/201 |
| 4,076,905 | 2/1978 | Sammells | 429/218 X |
| 4,818,645 | 4/1989 | Harris et al. | 429/209 |
| 4,844,996 | 7/1989 | Peled et al. | 429/194 |
| 4,950,566 | 8/1990 | Huggins et al. | 429/218 |

OTHER PUBLICATIONS

"Chemical Physics" (1985) vol. 95, pp. 17–35. An Article by Ramirez, et al.
"Journal of Solid State Chemistry" (1986) vol. 62, pp. 199–206, relied on an article by Nesper, et al.
"Proc. Electrochem Soc." (1988) vol. 88, No. 6, pp. 635–658. An Article by Anani, et al.
E. J. Frazer, J. Electroanal. Chem. 121, p. 329, (1981).
Y. Geronov, P. Zlatilova, R. V. Moshtev, J. Power Sources, 12, p. 145, (1984).
I. Epelboin, M. Froment, M. Garreau, J. Thevenin and D. Warin, J. Electrochem. Soc., 127, p. 2100, (1980).
C. K. Huang, S. Subbarao, D. H. Shen, F. Deligiannis, A. Attia and G. Halpert, proc. of Electrochemical Soc. Symposium, Seattle, Wash., Oct. (1990).

Primary Examiner—Stephen Kalafut
Attorney, Agent, or Firm—Thomas H. Jones; John H. Kusmiss; Guy M. Miller

[57] ABSTRACT

An ambient temperature, high density, rechargeable lithium battery includes a $Li_xMg_2Si$ anode which intercalates lithium to form a single crystalline phase when x is up to 1.0 and an amorphous phase when x is from 1 to 2.0. The electrode has good reversibility and mechanical strength after cycling.

14 Claims, 5 Drawing Sheets

Si: (1/8)×8+(1/2)×6=4

Mg: 8

Li(octa.): (1/4)×12+1=4

Li:Mg:Si = 4:8:4 = 1:2:1

LiMg2Si

ANODE FOR RECHARGEABLE AMBIENT TEMPERATURE LITHIUM CELLS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to ambient temperature batteries and more particularly, this invention relates to a rechargeable lithium cell employing an intercalated ternary lithium compound as the anode.

BACKGROUND OF THE INVENTION

Advanced, high energy density batteries are required for use in space, military, communication and automotive applications. Certain jurisdictions such as California have mandated that an increasing percentage of automobiles must be powered by electricity within the next few years. The lead-acid battery, though reliable and capable of many recharge cycles, is too heavy and has too low an energy to weight ratio. Lithium-based batteries have high energy density and low weight.

Rechargeable batteries using lithium anodes and transition metal oxide or chalcogenide cathodes were extensively investigated as candidates for powering electric vehicles about ten years ago. These batteries have not proved to be acceptable for this use due to poor cycle-life performance and concerns about their safety. Lithium is a very reactive material. When freshly deposited, lithium is highly active and can react with most inorganic and organic electrolytes which results in lower cycling efficiency. Prolonged cycling of secondary lithium cells produces large quantities of finely divided, dendritic lithium increasing the risk of thermal runaway. Hence, ambient temperature secondary lithium cells are potentially unsafe after (1) extended cycling, (2) being subjected to overcharge followed by over discharge.

STATEMENT OF THE PRIOR ART

Dendritic lithium growth and degradation of electrolyte by reaction with pure lithium can be reduced by use of lithium anodes that undergo displacement or insertion reactions at activities less than unity. Several lithium alloys and intercalation compounds are under investigation as candidates for Li anode materials. The best performing of these alternative anode materials are $LiC_6$ or LiAl. These alternative electrodes do improve reversibility and cycle life of the cells. However, their use results in a reduction of cell specific energy and power density. The energy and power reduction might be an acceptable trade-off if there was a significant improvement in cell cycle life, performance and safety.

However, these two alternate anode materials have other limitations. $LiC_6$ demonstrates poor ability to retain charge and LiAl has poor mechanical strength during cycling. Other anode materials that undergo insertion reactions such as, LiAlX ternary alloys and other intercalation compounds are being investigated for use in an ambient temperature, secondary lithium cell.

The use of $Mg_2Si$ has been investigated at high temperature (400° C.) in molten electrolyte batteries in U.S. Pat. No. 4,950,566 and article by these patentees entitled Thermodynamics of Ternary Systems and its Application to Si-Based Negative Electrode Materials, Proc. Electrochem. Soc. 88-6, PEOSDO 1988. This article investigated the proposed Li-Mg-Si ternary phase diagram at 400° C. The phase diagram showed that intercalation of Li into the $Mg_2Si$ will form Mg and several $Li_xSi$ phases at high temperature. However, the electrochemical and thermodynamic properties of the material $Li_xMg_2Si$ as alternate anode material at ambient temperature in organic electrolytes cells were not described in this work. The authors have not realized the significance of the use of this material in ambient temperature rechargeable Li cells.

STATEMENT OF THE INVENTION

In fact the behavior of $Mg_2Si$ as an anode material at ambient temperature is quite different. It has been discovered in accordance with this invention that $Mg_2Si$ only forms one crystalline phase $Li_1Mg_2Si$ at a first level of lithium insertion and forms an amorphous product when the lithium content is increased beyond $Li_1Mg_2Si$. It has further been discovered that $Mg_2Si$ has superior stability towards organic electrolyte, large capacity for storage of lithium, good reversibility and satisfactory mechanical strength after cycling even though the material expands and contracts during lithium ion insertion and de-insertion. Batteries containing the electrode of the invention utilize an organic electrolyte. Since there is no free lithium available, there is no dendritic growth.

Batteries containing the $Mg_2Si$ anodes can be the basis of an ambient temperature secondary lithium battery capable of being recharged numerous times. The batteries will find use in space, military, communication, automotive and other applications requiring high energy density, rechargeable lithium batteries.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
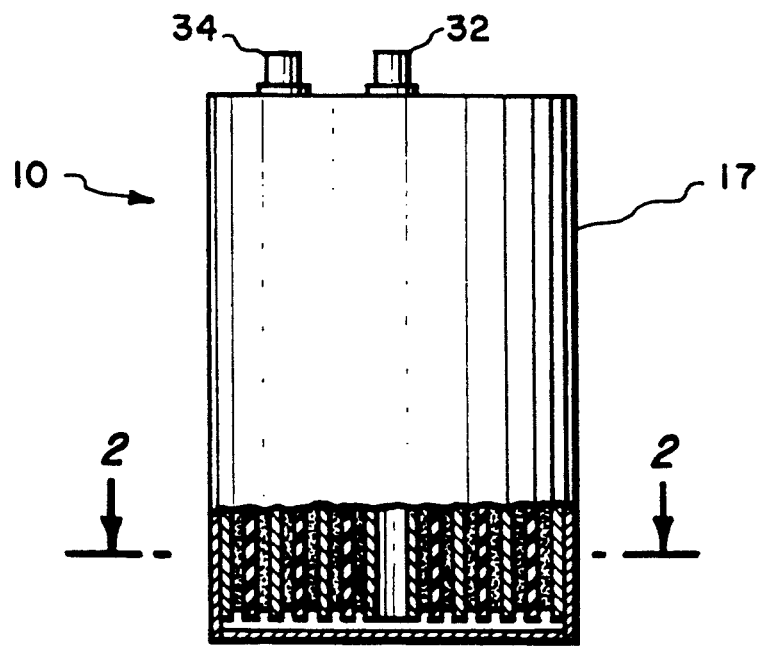
FIG. 1 is a front view in elevation and partial cut away of a spiral-wound, secondary alkaline metal battery.
Figure 2:
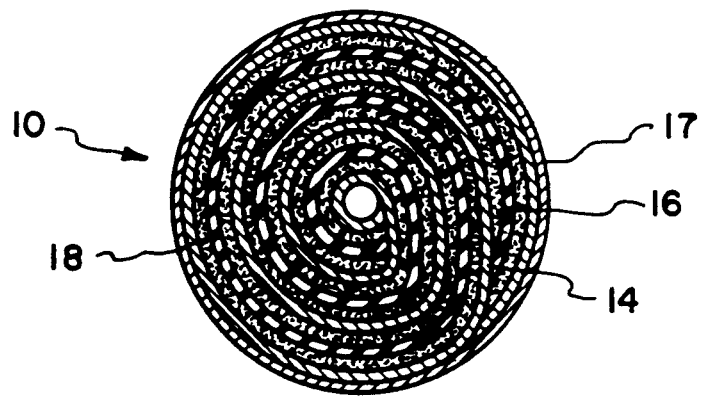
FIG. 2 is a section taken on line 2—2 of FIG. 1.
Figure 3:
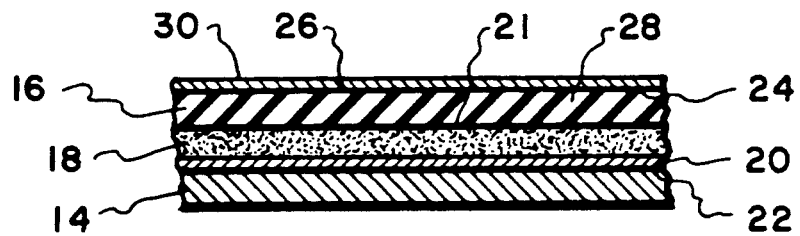
FIG. 3 is an enlarged view in section of the assembly of electrodes and separator sheet.

The preferred cell configuration is illustrated in FIGS. 1 and 2. The spiral-wound battery 10 contains electrodes 14, 16 disposed within a sealed casing 17. The electrodes 14, 16 are separated by sheets 18 of porous material imbibed with electrolyte. The separator sheets can be formed of Celgard (microporous polypropylene) or mats of porous fiberglass. As shown in FIG. 3, the negative electrode 14 consists of a composite layer 20 of $Li_xMgSi$ deposited on a high area current collector such as a nickel screen 22. The positive electrode 16 consists of a composite layer 24 of polymeric binder 26 containing a dispersion of chalcogenide or oxide particles such as $TiS_2$ or $Li_xCoO_2$ 28 pressed into a high area current collector such as a sheet 30 of expanded nickel. The positive electrode 14 separator 18, and the negative electrode 16 were spiral wound. The positive electrode 14 is connected to the terminal 32, and the negative electrode 16 is connected to the negative terminal 34.

The $Mg_2Si$ electrode at ambient temperature requires the presence of a binder such as 0.5 to 5% by weight of an organic polymer. The $Li_xMg_2Si$ material or composite with binder may also contain from 0.1 to 1 mol of silver based on each mol of lithium. Silver is believed to stabilize the intercalation of lithium and preserve the crystalline structure of the $Li_xMg_2Si$. The binder can be a hydrocarbon polymer such as polyethylene or polypropylene. However, longer cycle life is provided by use of elastomers which are capable of yielding as the intercalated chalcogenides expand and contract.

The elastomers should be inert to the solvent and stable in the electrochemical environment of the cell. The elastomer preferably has a glass transition temperature, Tg, below $-20°$ C. Preferred elastomers do not contain halogen or unsaturation, both of which are reactive with lithium ions. Preferred materials are ethylene-propylene (EPR) elastomers or ethylene-propylene-diene (EPDM) elastomers having a Mooney Viscosity (212° F.) between 10 and 100, usually from 35 to 75. EPDM polymers containing 50 to 70 mol percent ethylene, 20 to 40 mol percent propylene and 5 to 20 mol percent norborene are available from several commercial sources. The norborene group can be utilized for crosslinking by radiation or by heat.

The anode is fabricated by dissolving the EPDM polymer in common, volatile, inert solvent such as cyclohexane to form a 1, 2 or 4 weight percent (w/o) solution of suitable viscosity. The $Mg_2Si$ is then added and the dispersion stirred to form a paste containing 1 to 5 weight percent binder. The paste is then coated onto a screen or other support and dried in vacuo to remove solvent. Slight pressure can be applied to the finished electrode to improve smoothness of the surface, but it is normally not necessary.

The electrolyte comprises a solution of an ionized lithium salt in a highly polar solvent such as sulfolane or 2-methyl tetrahydrofuran (2MeTHF). The solvent may also contain from 5 to 20 percent of an agent such as ethylene carbonate which is capable of modifying the surface of the lithium electrode to form a solid electrolyte film as described in U.S. Pat. No. 5,030,528, the disclosure of which is incorporated herein by reference. The salt, usually contains an anionic or complexing moiety, Z, such as halide, sulfate, arsenofluoride, beta-alumina, thiocyanate, nitrate, phosphofluoride, percholorate, fluoroborate, aryl borate, etc. The concentration of salt in the electrolyte can be from 0.5 to 3.0 molar, usually from about 0.8 to 1.5 molar. Especially useful electrolyte salts include $LiAsF_6$, $LiCO_4$, $LiBF_4$, KCNS, LiCNS, lithium tetraphenyl borate, $LiCF_3SO_3$, $LiPF_6$ and the like. $LiAsF_6$ is preferred since it has good stability.

The following electrochemical cell was fabricated to evaluate $Li_xMgSi$ material.

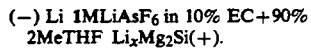

$(-)$ Li 1MLiAsF$_6$ in 10% EC+90% 2MeTHF $Li_xMg_2Si(+)$.

The cell contained a pure lithium negative electrode and a porous positive electrode of 98% $Mg_2Si$ and 2% by weight of EPDM cold pressed into pellets. All fabrication and experimental measurements were carried out in an oxygen-filled dry box.

Electrochemical properties of this cell and of the positive electrode were studied.

Figure 4:
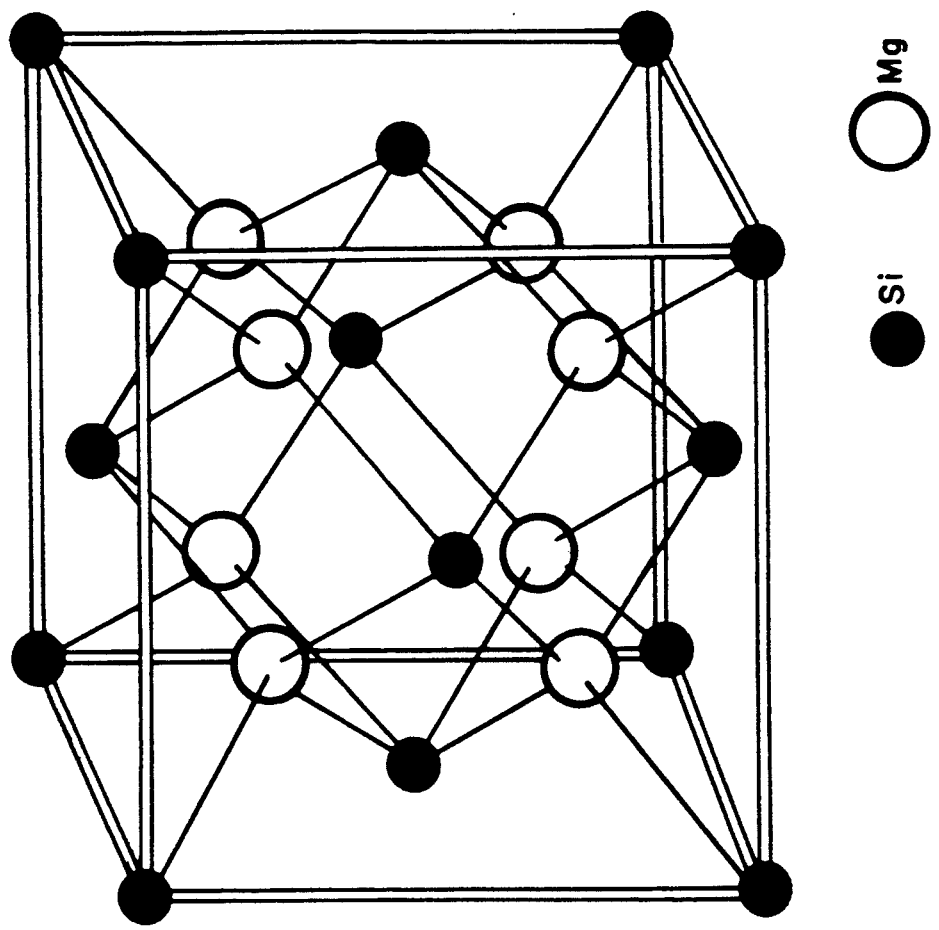
FIG. 4 is an isometric view of the crystal structure of $Mg_2Si$.
Figure 5:
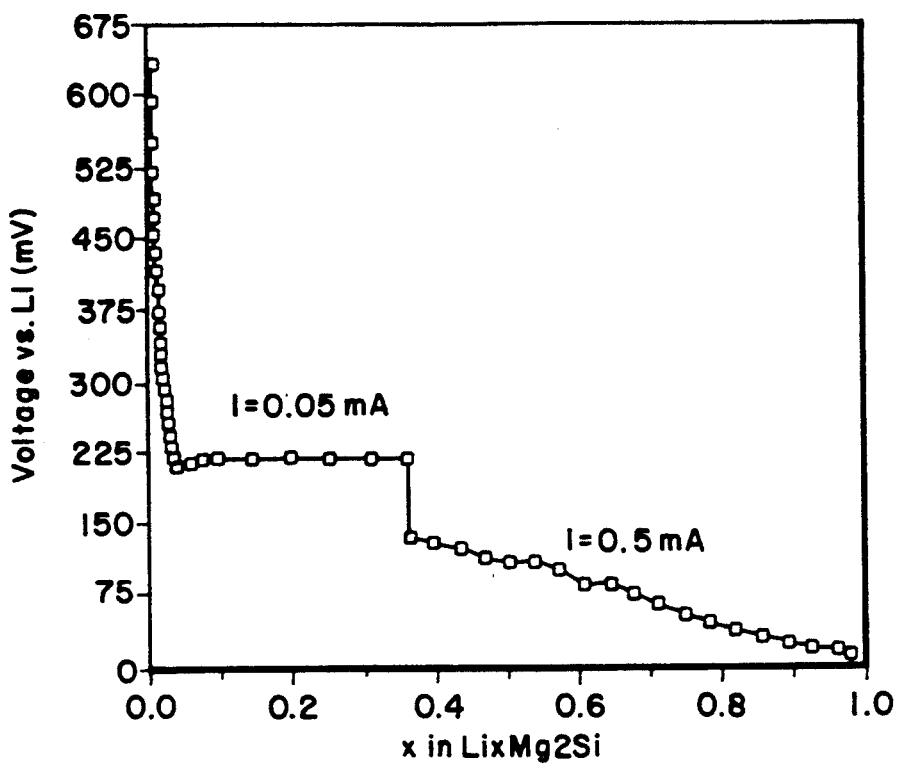
FIG. 5 is a graph illustrating the intercalation of lithium into $Mg_2Si$, at a first current of 0.05 mA and a second current of 0.5 mA.
Figure 7:
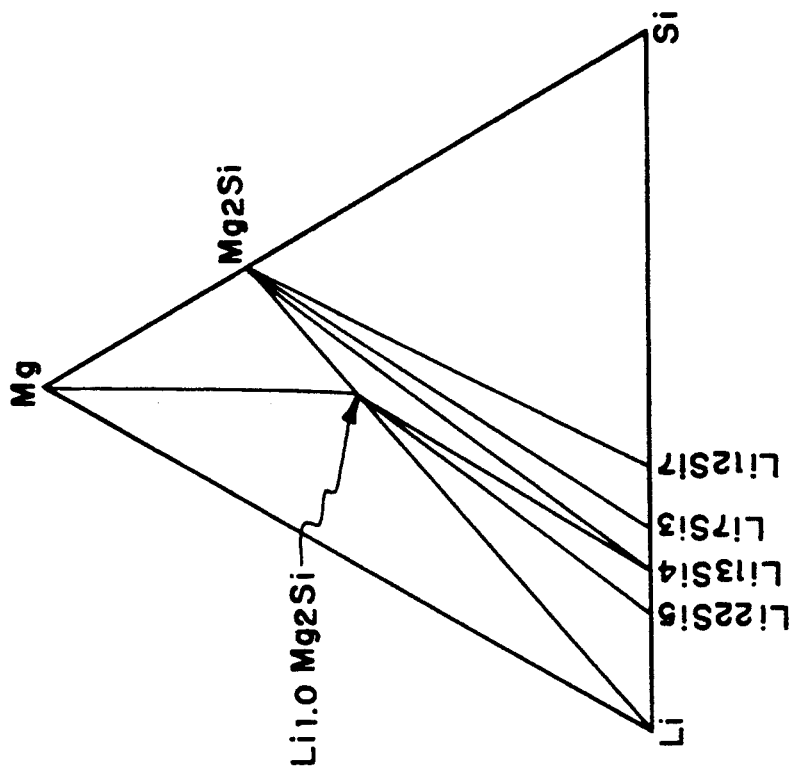
FIG. 7 is a ternary phase diagram of the Li-Mg-Si system at 25° C.
Figure 6:
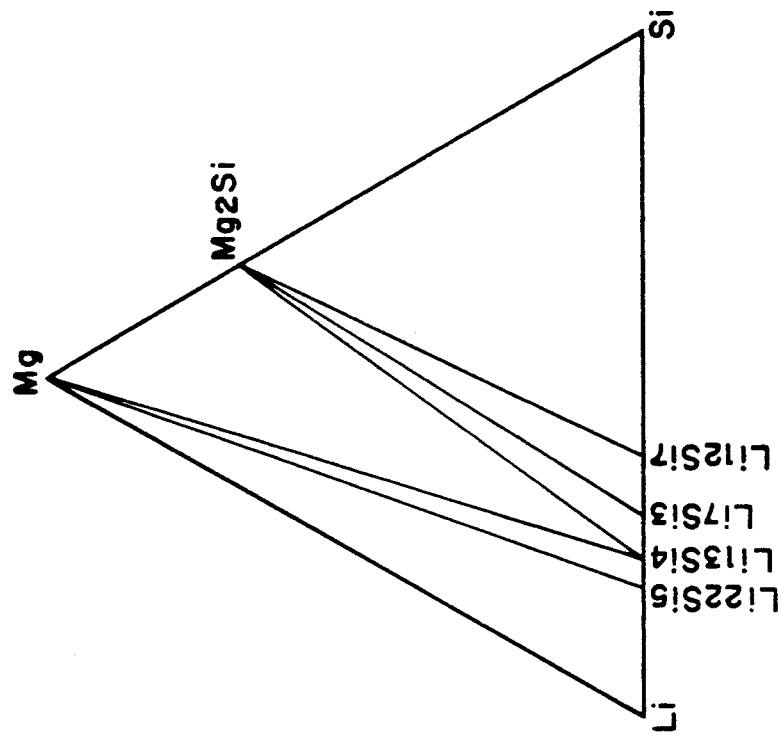
FIG. 6 is a ternary phase diagram of the Li-Mg-Si system at 400° C.

From the Mg-Si binary phase diagram, $Mg_2Si$ is the only compound which is formed between Mg and Si. As shown in FIG. 4, this material has a fluorite structure, which is face-centered cubic, with Si atoms at cube corners and face centers, and Mg atoms occupying all the tetrahedral sites. The remaining available sites for Li in the structure are all the octahedral sites. Therefore, it can be predicted that one mole $Mg_2Si$ may be able to accommodate one mole Li. In order to intercalate Li electrochemically into $Mg_2Si$ at ambient temperature, a very small current (I=0.05 mA) was applied to the sample. As shown in FIG. 5, a voltage plateau was observed at 260 mV (vs. Li) which is very attractive for the purpose of using this material as an alternate anode. At the stage when the Li composition reached x=0.36 in $Li_xMg_2Si$, the current was increased to 0.5 mA to accelerate the intercalation process. It can intercalate electrochemically about one Li per $Mg_2Si$ (FIG. 5) and still keep the crystal structure predicted from the structure considerations. The X-ray diffraction analysis did not show the evidence of the existence of Mg or $Li_{13}Si_4$ phase. This implied that electrochemical intercalation of Li into $Mg_2Si$ formed single phase instead of multiphases. Therefore, the major difference in the ternary phase diagrams of the Li-Mg-Si system at 400° C. (FIG. 6) and at 25° C. (FIG. 7) is that the line connecting Li and $Mg_2Si$ exists in the phase diagram at 25° C. (FIG. 7). A single crystalline phase material will usually have faster kinetics than a multiple phase material which slows down and absorbs energy during reconstruction of the crystal into a new phase. Single phase materials do not need to reconstruct the crystal structure. The lithium ions simply enter between the planes and expand the structure of the crystal.

Figure 9:
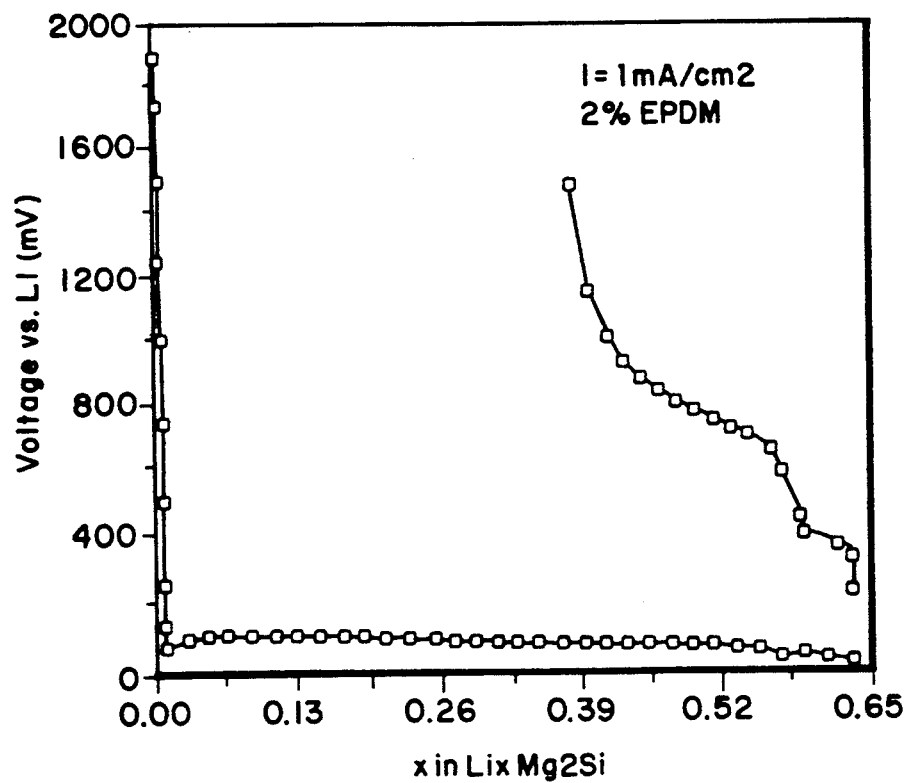
FIG. 9 is a graph illustrating the charge and discharge characteristics of $Li_xMg_2Si$.
Figure 8:
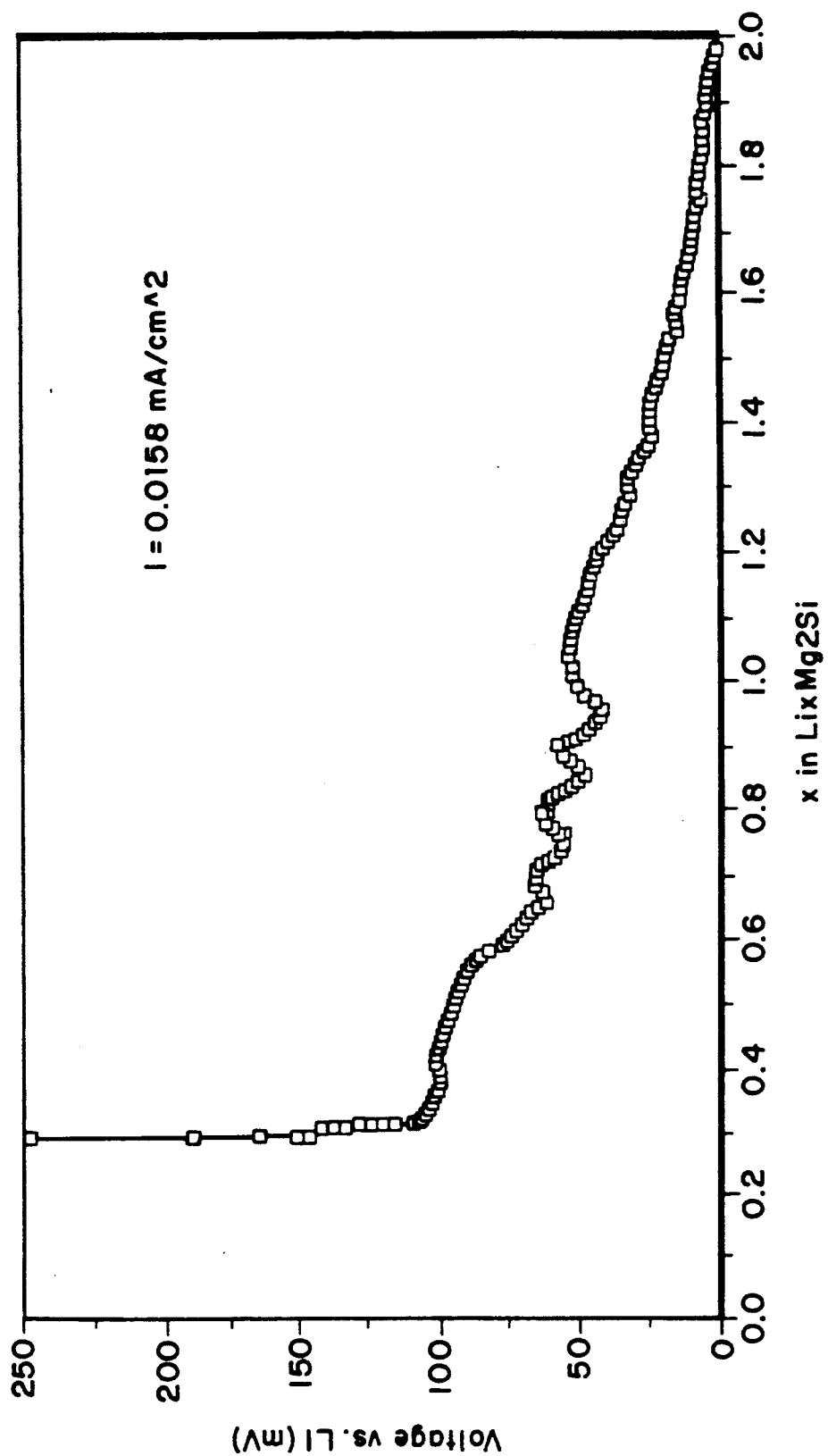
FIG. 8 is a graph showing intercalation of lithium into $Mg_2Si$ at a current of 0.0158 $mA/cm^2$.

Continued Li intercalation at very low current beyond the composition $Li_{1.0}Mg_2Si$, caused the material to become amorphous. It was determined that an additional mole of lithium could be intercalated into $Li_{1.0}Mg_2Si$ at I=0.0158 mA/cm$_2$ as shown in FIG. 8. Powder X-ray diffraction results for $Li_{1.0}Mg_2Si$ and $Li_{2.0}Mg_2Si$ showed that long range order in the $Mg_2Si$ crystal structure gradually disappears due to reaction with lithium. At the completion of Li intercalation, the X-ray diffraction pattern of the sample showed no indication of long range order, and $Li_2Mg_2Si$ became amorphous. Several features of the pseudo-titration curve (discharge curve) of intercalating Li into $Mg_2Si$ are noteworthy. The discharge curve shown in FIG. 8 can be divided into three main regions based on the Li composition in the Li$_x$Mg$_2$Si. These are (1) $0<x<0.6$, (2) $0.6<x<1.0$ and (3) $1.0<x<2.0$. At $x\sim 0.6$, the cell voltage was not stable and showed periodic changes up to $x\sim 1.0$. However, further lithium intercalation up to $x\sim 2$ gave a smooth voltage vs. composition curve. The voltage fluctuation in the discharge curve when Li intercalated into Mag$_2$Si may have something to do with the structure breakdown of the material. The de-intercalation of Li out of Li$_x$Mg$_2$Si at 1 mA/cm$^2$ was also evaluated and the result is shown in FIG. 9. Experimental results indicated that the electrode integrity was in good condition and this material was stable in the non-aqueous organic electrolyte.

Li$_x$Mg$_2$Si was found to be stable in the EC+2-MeTHF electrolyte and up to two mols of Li can be intercalated into this material at low current. However, the final product became amorphous. Intercalation of Li into Mg$_2$Si will form a single metastable phase instead of multi-phases. In addition, the voltage fluctuation in the discharge curve when Li intercalated into Mg$_2$Si is due to the structure breakdown of Li$_x$Mg$_2$Si. However, stabilization of the material crystal structure may be achieved by the addition of other elements such a Ag which in turn enhances Li reversibility.

It is to be realized that only preferred embodiments of the invention have been described and that numerous substitutions, modifications and alternations are permissible without departing from the spirit and scope of the invention as defined in the following claims.

We claim:

1. An anode for an ambient temperature battery consisting essentially of a single phase of Li$_x$Mg$_2$Si in which x is from 0.1 to 2.0, said single phase being crystalline when x is from 0.1 to 1.0 and being amorphous when x is from more than 1.0 to 2.0.

2. An anode according to claim 1 in which the Li$_x$Mg$_2$Si is crystalline.

3. An anode according to claim 1 in which the Li$_x$Mg$_2$Si is amorphous.

4. An anode according to claim 1 containing from 0.1 to 1 moles of silver based on each mol of lithium.

5. An anode according to claim 1 further comprising from 1 to 5% by weight of an organic binder.

6. An anode according to claim 5 in which the binder is an ethylene-propylene elastomer.

7. A secondary battery comprising a positive electrode, an organic electrolyte comprising a solution of a lithium salt in a polar organic solvent and a Li$_x$Mg$_2$Si electrode in which x is from 0.1 to 2.0.

8. A battery according to claim 7 in which the solvent further includes from 5 to 20 percent of an electrode surface modification agent.

9. A battery according to claim 7 in which the lithium salt is LiAsF$_6$.

10. A battery according to claim 7 in which the positive electrode comprises Li$_x$Mg$_2$Si dispersed in a minor amount of organic binder.

11. A battery according to claim 10 in which the binder is an elastomer.

12. A battery according to claim 11 in which the elastomer is an ethylene-propylene-diene polymer.

13. A battery according to claim 10 in which the positive electrode includes silver.

14. A battery according to claim 13 in which silver is present in the positive electrode in an amount of 0.1 to 1.0 molar based on each mol of lithium.

* * * * *